July 23, 1957     I. NEUSTADTER     2,799,933
DENTAL JACKET CROWN AND RESTORATIONS
Filed April 7, 1955     2 Sheets-Sheet 2

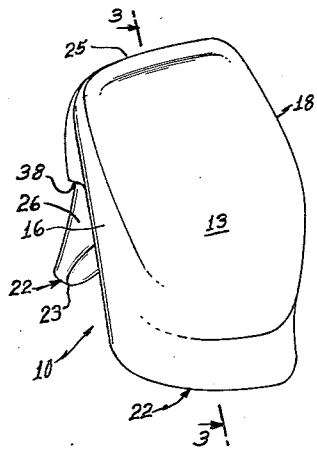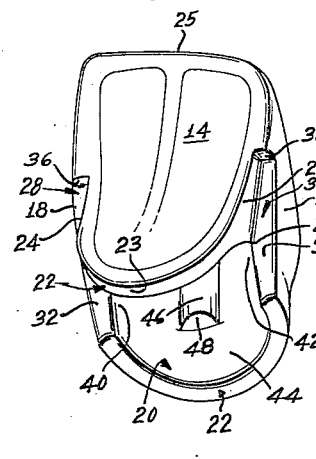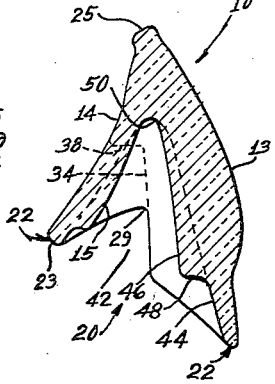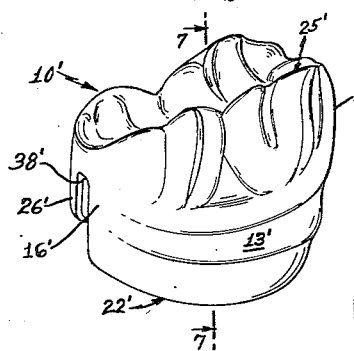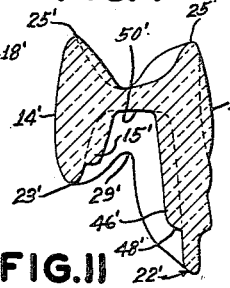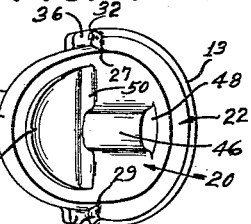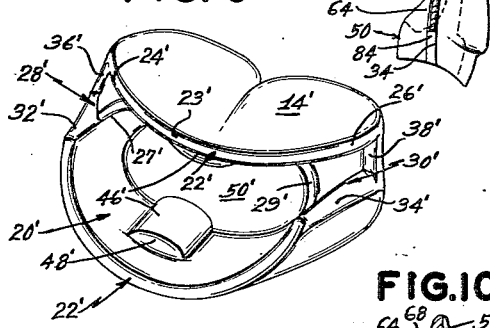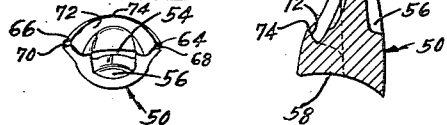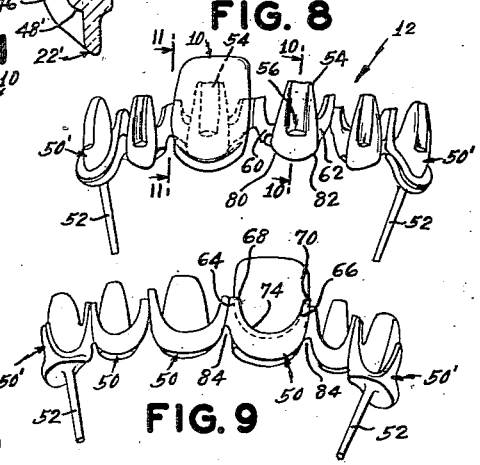

INVENTOR.
*Irving Neustadter*
BY
ATTORNEYS

United States Patent Office 2,799,933
Patented July 23, 1957

2,799,933
DENTAL JACKET CROWN AND RESTORATIONS

Irving Neustadter, Brooklyn, N. Y., assignor, by mesne assignments, to Dental Ceramics, Inc., Staten Island, N. Y., a corporation of New York Application April 7, 1955, Serial No. 499,800

18 Claims. (Cl. 32—12)

This invention relates generally to a dental jacket-crown and method of making dental restorations and, more particularly, to a dental jacket-crown of the frame-supported type and method of making dental restorations of the frame-supported jacket-crown type.

One object of the present invention is the provision of a prefabricated dental jacket-crown which has improved provisions for the support thereof by its supporting frame of the restoration whereby to provide a stronger restoration consistent with lightness in weight and user comfort.

Another object of the present invention is the provision of prefabricated jacket-crown of the above character which has substantially higher mesial and distal engagement with its supporting frame to provide superior supporting characteristics in which the support for the jacket-crown is distributed over a relatively large area.

Another object of the present invention is the provision of prefabricated jacket-crown having provision for the support thereof at the labial side of the restoration to provide increased and better distributed support for the jacket-crown, said labial support provision imparting increased opacity to said jacket-crown at the labial side thereof to thereby enhance the aesthetic characteristics of the jacket-crown.

Another object of the present invention is the provision of a prefabricated jacket-crown of the aforenoted character which is adapted for support on a restoration in an improved manner whereby its gingival portions may be mesially and distally contoured to provide aesthetically and hygienically desired interproximal spaces with an adjacent jacket-crown without exposing the metal frame of the restoration to view from the front of the user's mouth.

Yet another object of the present invention is the provision of an improved method of making a dental restoration of the frame supported jacket-crown type utilizing a prefabricated jacket-crown of the aforenoted character.

The above and other objects, features and advantages of the present invention will be more fully understood from the following description considered in connection with the accompanying illustrative drawings.

In the drawings which illustrate the best mode now contemplated by me for carrying out my invention:

Fig. 1 is an enlarged front perspective view of an anterior jacket-crown formed according to the present invention;

Fig. 2 is a rear perspective view thereof;

Fig. 3 is a sectional view taken on the line 3—3 of Fig. 1;

Fig. 4 is a bottom plan view thereof;

Fig. 5 is a view similar to Fig. 1 of a molar jacket-crown;

Fig. 6 is a bottom side perspective view thereof;

Fig. 7 is a sectional view taken on the line 7—7 of Fig. 5;

Fig. 8 is a front view of a restoration frame formed according to the present invention showing a jacket-crown secured thereto;

Fig. 9 is a rear view thereof;

Fig. 10 is a sectional view taken on the line 10—10 of Fig. 8;

Fig. 11 is a sectional view taken on the line 11—11 of Fig. 8;

Fig. 12 is a plan view of the restoration frame part shown in Fig. 10;

Figure 13:
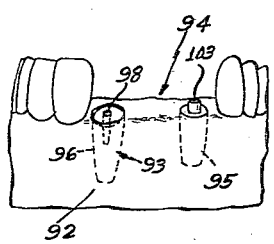
Fig. 13 is a front view of a model of anterior upper teeth showing one tooth missing and adjacent parts for the abutments.
Figure 14:
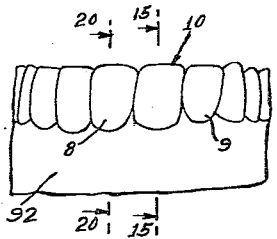
Fig. 14 is a front view of a model showing the jacket-crowns in position thereon.

Referring to the drawings, and more particularly to Figs. 1 through 4 thereof, there is shown an anterior jacket-crown or restoration tooth 10 which is adapted for securement to the restoration frame 12 in the manner to be described in detail hereinafter. The jacket-crown 10 comprises a labial wall 13, a lingual wall 14, and mesial and distal walls 16 and 18, respectively, said jacket-crown being in the form of a hollow tooth-shaped body having an internal opening 20 therein. The lingual wall 14 extends in a vertical direction between the gingival edge portion 23 and the incisal edge 25 of the jacket-crown and has vertical edges 24 and 26 which terminate laterally inwardly of the mesial and distal sides, respectively, of the jacket-crown. The jacket-crown 10 is provided with vertical marginal edge or recessed portions 28 and 30 adjacent the mesial and distal sides thereof and the mesial and distal edges 24 and 26, respectively, of the lingual wall 14, said vertical marginal edge portions facing towards the lingual side of the jacket-crown and being adapted to interfit and abut complementary portions of the restoration frame 12 in the manner to be described in detail hereinafter. The vertical marginal edge portions 28 and 30 define vertical shoulders 32 and 34, respectively, which extend from the gingival edge 22 towards the incisal edge 25, said vertical shoulders terminating in horizontal shoulders 36 and 38, respectively, below said incisal edge at the lingual side of the jacket-crown. The lingual side of the jacket-crown is further provided with mesial and distal recesses 40 and 42 which extend from the gingival edge 22 to the points 27 and 29, respectively, of the vertical marginal edge portions 28 and 30, respectively, the latter thus constituting formations extending vertically from said recesses towards the incisal edge 25 of the jacket-crown. From the above it will be apparent that the marginal edge or recessed portions 28 and 30 are open at the outer lingual side of the jacket-crown and are closed at the labial side thereof, with each of said portions extending vertically in a gingival to incisal directional and extending also in a mesial-distal direction. The vertical side edges 24 and 26 of the wall 14 define the inner lateral boundaries of the recessed portions 28 and 30, respectively.

The labial internal wall surface 44 of the jacket-crown 10 has a projecting portion 46 which extends vertically in a gingival-incisal direction and terminates in a horizontal shoulder 48 inwardly of the gingival edge 22. Thus the projecting portion 46 is disposed at the inner side of the anterior wall of the jacket-crown and extends longitudinally in a gingival to incisal direction and terminates adjacent the internal terminal edge 50 of the opening 20. It will be noted that the lingual wall 14 is thickened at its inner side as indicated at 15 inwardly of its lower marginal edge 23 with said thickening gradually tapering towards the edge 50 of the opening 20.

With reference to Figs. 5 through 7, there is shown a molar jacket-crown 10' which is structurally similar to the jacket-crown described above. The jacket-crown of the present invention, which is in the form of a hollow tooth-shaped body, may be used as a restoration for any tooth, for example, said jacket-crown may be an anterior crown as shown in Figs. 1 through 4, or a molar crown as shown in Figs. 5, 6 and 7. The recessed portions 28' and 30' correspond in all respects to portions 28 and 30, described above, and said portions 28' and 30' are open at the outer lingual side of the crown and are closed at the buccal side thereof, said portions extending vertically in a gingival to the occlusal direction and also extending laterally in a mesial-distal direction. The projections 46', which are similar to the projection 46 described above with reference to the jacket-crown 10, are disposed on the inner wall surfaces at both the buccal and lingual sides of the crown, said projections extending vertically in a gingival to occlusal direction. From the above it will be apparent that the molar jacket-crown 10' is structurally similar to the anterior jacket-crown 10 described above except that the jacket-crown 10' is provided with projections 46' on the inner wall surfaces at both the buccal and lingual sides of the jacket-crown.

The restoration frame 12 (Figs. 8 through 12) may be constructed to support one or more jacket-crowns of the character described above, said frame of the illustrated embodiment comprising a plurality of interconnected separately formed frame parts or core 50, the end frame parts 50' constituting abutments for the support of the restoration in the patient's jaw, it being understood that said abutments may be of any desired form or construction depending on the preference of the dentist, said abutments of the illustrated embodiment having downwardly projecting pins or posts 52 which are adapted to be received in complementary recesses provided therefor in teeth roots in the patient's jaw. Each of the frame parts 50 is adapted to mount and support a complementary jacket-crown of the character described above and said parts 50 are adapted to be individually cast in the manner to be described hereinafter to interfit with their companion jacket-crowns. The frame part 50, adapted to mount a companion anterior jacket crown 10, has a vertically extending core part 54 which interfits with the opening 20 of said crown, said core part being provided with a front vertical recess 56 which interfits with the projection 46 to provide a support for the jacket-crown at the labial side thereof. The core part 50 has a gingival surface portion 58 which is adapted to abut the gum of the patient and interfit therewith when the restoration is secured in position in the patient's mouth. The frame part 50 further includes horizontal portions 60 and 62 which are adapted to interfit with the recesses 40 and 42, respectively, externally of the jacket-crown at the lingual side thereof. The vertical core parts or flanges 64 and 66 extend upwardly from the portions 60 and 62, respectively, of the frame part 50, said parts 64 and 66 being disposed laterally adjacent the core 54 and being adapted to abut and interfit with the recessed portions 28 and 30, respectively, when said core is positioned in the opening 20. The vertical parts 64 and 66 terminate in shoulders 68 and 70, respectively, which are adapted to abut their companion shoulders 36 and 38, respectively, of the companion jacket-crown.

Each of the frame parts 50 is of one-piece cast construction and it will be apparent that each frame part is cast complementary to its companion jacket-crown whereby to provide for the interfit of said jacket-crown with its companion frame part. The jacket-crowns to be used for the restoration are prefabricated and are selected by the dentist in accordance with the particular restoration to be made and the frame parts 50 are cast to fit and support their companion jacket-crowns. The arcuate gingival edge portion 23 of the part 14 of the jacket-crown is adapted to be received in a complementary arcuate recess 72 provided in its companion frame part, said recess terminating at its posterior side in an arcuate edge 74. From the above it will be apparent that when the core part 54 is disposed in the internal opening 20 of the jacket-crown the laterally disposed vertical parts 64 and 66 of the frame part 50 will abut and interfit with their complementary recessed portions 28 and 30, respectively, provided in the jacket-crown. The interfitting relation between the gingival edge portion 23 of the part 14 and the recess 72 of the frame part 50 provides increased support for the jacket-crown at the lingual side thereof. The provision of the projection 46 at the labial side of the jacket-crown provides for increased and better distributed support for the jacket-crown at said side, said labial support provision 46 imparting increased opacity to said jacket-crown at the labial side thereof to thereby enhance the aesthetic characteristics of the jacket-crown. Accordingly the projection 46, in addition to strengthening the jacket-crown and providing a support therefor at the labial side thereof, provides a thickened anterior wall so that the core 54 of the frame part 50 will not discolor the jacket-crown or modify the desired color thereof. The provision of the recessed portions 28 and 30 of the jacket-crown provide for a relatively high mesial and distal engagement of the latter with its supporting frame part 50 whereby superior supporting characteristics result in which the support for the jacket-crown is distributed over a relatively large area. By way of example, the recessed portions 28 and 30 may provide for a mesial and distal engagement with its companion frame part 50 of the order of approximately three-fourths the distance from the gingival edge of the jacket-crown towards the incisal or occlusal edge thereof. This relatively high mesial and distal engagement between the jacket-crown and its supporting frame part 50 permits the latter to be mesially and distally contoured as indicated at 80 and 82 at its gingival edge so that the gingival anterior edge 22 of the jacket-crown may be mesially and distally contoured to provide aesthetically and hygienically desired interproximal spaces 84 with an adjacent jacket-crown without exposing the frame to view from the front of the user's mouth. Accordingly the jacket-crown 10 has its gingival anterior edge mesially and distally contoured and corresponding portions of the frame part 50 are similarly contoured to provide interproximal spaces 84 with an adjacent jacket-crown without exposing portions of the frame parts 50 to view, it being understood that said frame part may be so contoured without the weakening thereof due to the relatively high mesial and distal engagement between the vertical portions 64 and 66 of the frame part and their companion recessed portions of the jacket-crown. Each of the frame parts 50 is individually made to fit a companion jacket-crown and said frame parts may be interconnected to each other in any suitable manner, for example, by a conventional soldering operation, it being understood that suitable abutments in accordance with the dentist's preference will be provided for securing the frame and the jacket-crown or jacket-crowns carried thereby to the patient's jaw. It will also be apparent that the restoration described above may be of the removable type.

Figure 17:
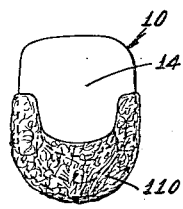
Fig. 17 is a rear view thereof.
Figure 15:
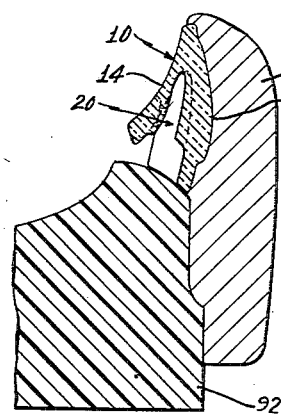
Fig. 15 is a vertical sectional view, on an enlarged scale, taken on the line 15—15 of Fig. 14.
Figure 16:
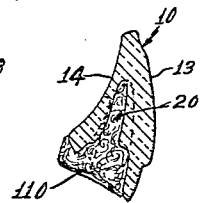
Fig. 16 is a vertical sectional view of the restoration jacket-crown and the wax pattern thereof.
Figure 18:
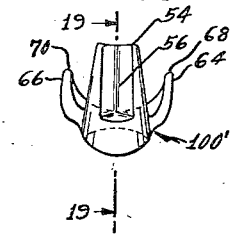
Fig. 18 is a front view of a frame unit made from the wax pattern shown in Figs. 16 and 17.
Figure 19:
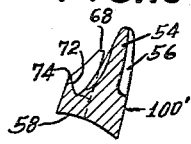
Fig. 19 is a sectional view taken on the line 19—19 of Fig. 18.
Figure 20:
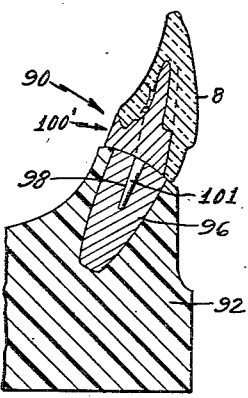
Fig. 20 is a vertical sectional view, on an enlarged scale, taken on the line 20—20 of Fig. 14.
Figure 22:
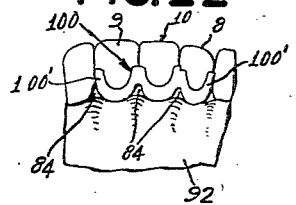
Fig. 22 is a rear view thereof.
Figure 21:
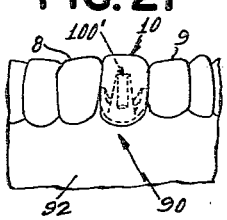
Fig. 21 is a front view of a model of the anterior upper jaw showing the restoration in place.

Referring to Figs. 13 through 22, there is illustrated the method of preparing the dental restoration or bridge 90 which is of the frame-supported jacket-crown type. In Fig. 13 there is illustrated a view of a model 92 prepared from an impression of the patient's upper anterior jaw portion which has a space indicated at 94 corresponding to a missing tooth which is to be restored. The model is shown provided with the dies 93 and 95 adjacent the space 94 to provide abutments for the restoration. As previously noted, the jacket-crowns are in the form of prefabricated hollow tooth-shaped bodies and the frame 100 is formed by uniting the cast frame units, each of which is cast from a pattern of the interior of its companion jacket-crown including the recessed portions 28 and 30 thereof previously described in detail. The frame parts or units 100' for the root die 96 and part or die 103 which form abutments for the frame are prepared in any desired manner as by means of casting such units from patterns of their companion prefabricated jacket-crowns 8 and 9, respectively, of the present invention. The prefabricated jacket-crowns 8, 9 and 10, selected for the restoration, are placed in their correct position on the model 92 and the jacket-crowns are temporarily held in place in any suitable manner, for example by means of wax. An index or matrix 108 is formed by pouring any suitable material, for example plaster of Paris, over the labial or front surface of the jacket-crowns 8, 9 and 10 and the adjacent jaw region for holding said jacket-crowns in position on the model. Thereafter, the matrix or index 108 is removed from the model 92 and the jacket-crowns 8, 9 and 10 are removed from their position on said model and the internal surfaces thereof are lubricated in any desired manner as by means of a thin film of oil. The matrix with the jacket-crowns in position are then replaced on the model and the wax cores are then obtained from the prefabricated jacket-crowns. As shown in Figs. 16 and 17, for example, the wax pattern 110 is made of the internal opening and lingual surfaces of the jacket-crown 10 and said wax patterns correspond to the frame units 100' to be cast therefrom. The frame unit 100' cast from the pattern 110 and the frame 100 may be attached to any desired abutment means in acordance with the preference of the dentist, the herein illustrated and described abutment means being given by way of example only. It will be understood that any number of frame units may be cast either in one piece or separately pursuant to the method described above depending on the particular restoration to be made and the preference of the dentist. If the frame units are cast separately they may be secured together by solder or in any other suitable way, the matrix or index facilitating the properly oriented assembly of the frame units. In Fig. 20 the jacket-crown 8 and the metal core 100' of the restoration 90 is shown secured by the metal pin 101 which fits into the simulated root canal 98 of the simulated root 96 of the model 92. It will be understood that in the case of jacket 9, the frame therefor will correspond to the die part 103 provided in the model to simulate a natural tooth which had been prepared by the dentist to furnish a natural frame core abutment in the patient's mouth for the jacket-crown 9. In Figs. 21 and 22 the restoration 90 is shown in place in the model of the patient's jaw, Fig. 22 showing the interproximal spaces 84 between adjacent frame parts and their companion jacket-crowns.

It will be apparent that if desired the restoration frame may be fixedly or removably secured to the patient's jaw, otherwise than as here shown, in any desired manner using abutment means in accordance with the dentist's preference.

It will be understood that the present invention is especially well adapted for providing a bridge for either one tooth or a plurality of teeth and in the latter case the plurality of restoration teeth are individually formed as each consists of a single jacket-crown. Likewise, in the case of the frame, each restoration tooth has its own frame unit although the several units of the frame are connected together either integrally when cast together or by solder when cast separately. When the frames are formed separately from each other, the matrix or index 108 may be used to position them in their correct relations for the soldering operations. Also, it will be understood that while the posterior tooth selected for illustration is a molar tooth, the invention is fully applicable for the restoration of bicuspid teeth. Further it will be understood that the jacket-crowns may be of porcelain or of any other material suitable for the formation and use thereof.

While I have shown and described the preferred embodiments of my invention, it will be understood that various changes may be made in the idea or principles of the invention within the scope of the appended claims.

Having thus described my invention, what I claim and desire to secure by Letters Patent, is:

1. A dental jacket-crown for a restoration of the frame-supported type, said jacket-crown having mesial and distal recessed portions open at the outer lingual side of the jacket-crown and closed at the labial or buccal side of the jacket, each of said recessed portions extending vertically in a gingival to incisal or occlusal direction and extending also laterally in a mesial-distal direction.

2. A dental jacket-crown for a restoration of the frame-supported type, said jacket-crown having mesial and distal recessed portions open at the outer lingual side of the jacket-crown and closed at the labial or buccal side of the jacket, each of said recessed portions extending vertically in a gingival to incisal or occlusal direction and extending also laterally in a mesial-distal direction, said jacket-crown comprising an outer wall at its lingual side having opposite mesial and distal side edges defining the inner lateral boundaries, of said recessed portions respectively.

3. A dental jacket-crown for a restoration of the frame-supported type, said jacket-crown having mesial and distal recessed portions open at the outer lingual side of the jacket-crown and closed at the labial or buccal side of the jacket, each of said recessed portions extending vertically in a gingival to incisal or occlusal direction and extending also laterally in a mesial-distal direction, said recesses terminating below the incisal or occlusal edge of the jacket-crown.

4. A dental jacket-crown for a restoration of the frame-supported type, said jacket-crown having mesial and distal recessed portions open at the outer lingual side of the jacket-crown and closed at the labial or buccal side of the jacket, each of said recessed portions extending vertically in a gingival to incisal or occlusal direction and extending also laterally in a mesial-distal direction, said jacket-crown comprising an outer wall at its lingual side having opposite mesial and distal side edges defining the inner lateral boundaries, of said recessed portions respectively, said recesses terminating below the incisal or occlusal edge of the jacket-crown.

5. A dental jacket-crown for a restoration of the frame-supported type, said jacket-crown comprising a hollow tooth-shaped body having a projection on the inner side of the anterior or buccal wall of said body, said projection extending in a gingival to incisal or occlusal direction.

6. A dental jacket-crown for a restoration of the frame-supported type, said jacket-crown comprising a hollow tooth-shaped body having a projection on the inner side of the anterior or buccal wall of said body, said projection extending in a gingival to incisal or occlusal direction, said tooth-shaped body having mesial and distal recessed portions open at the outer lingual side of the jacket-crown and closed at the labial or buccal side of the jacket, each of said recessed portions extending vertically in a gingival to incisal or occlusal direction and extending also laterally in a mesial-distal direction.

7. A dental jacket-crown for a restoration of the frame-supported type, said jacket-crown comprising a hollow tooth-shaped body having a projection on the inner side of the anterior or buccal wall of said body, said projection extending in a gingival to incisal or occlusal direction, said tooth-shaped body having mesial and distal recessed portions open at the outer lingual side of the jacket-crown and closed at the labial or buccal side of the jacket, each of said recessed portions extending vertically in a gingival to incisal or occlusal direction and extending also laterally in a mesial-distal direction, said tooth-shaped body having an outer wall at its lingual side having opposite mesial and distal side edges defining the inner lateral boundaries, of said recessed portions respectively.

8. A dental jacket-crown for a restoration of the frame-supported type, said jacket-crown comprising a hollow tooth-shaped body having a projection on the inner side of the anterior or buccal wall of said body, said projection extending in a gingival to incisal or occlusal direction, said tooth-shaped body having mesial and distal recessed portions open at the outer lingual side of the jacket-crown and closed at the labial or buccal side of the jacket, each of said recessed portions extending vertically in a gingival to incisal or occlusal direction and extending also laterally in a mesial-distal direction, said tooth-shaped body having an outer wall at its lingual side having opposite mesial and distal side edges defining the inner lateral boundaries, of said recessed portions, respectively, said recesses terminating below the incisal or occlusal edge of the jacket-crown.

9. A dental restoration, comprising a frame and a companion jacket-crown mounted thereon, said jacket crown comprising a hollow tooth-shaped body and said frame having a core part interfitting with said body internally thereof, said frame and said body having horizontally disposed parts in interengagement externally of said body at the lingual side of the latter for supporting said body on said frame.

10. A dental restoration, comprising a frame and a companion jacket-crown mounted thereon, said jacket-crown comprising a hollow tooth-shaped body and said frame having a core part interfitting with said body internally thereof, said frame and said body having vertically disposed parts in interengagement externally of said body at the lingual side of the latter, said vertically disposed parts of the frame forming a backing for said jacket and being concealed anteriorly of the restoration by said vertically disposed parts, respectively, of the jacket-crown.

11. A dental restoration, comprising a frame and a companion jacket-crown mounted thereon, said jacket-crown comprising a hollow tooth-shaped body and said frame having a core part interfitting with said body internally thereof, said core having a recess and said tooth-shaped body having a projection on the inner side of the anterior wall thereof interfitting with said core in said recess thereof.

12. A dental restoration, comprising a frame and a companion jacket-crown mounted thereon, said jacket-crown comprising a hollow tooth-shaped body and said frame having a core part interfitting with said body internally thereof, said frame and said body having horizontally disposed parts in interengagement externally of said body at the lingual side of the latter for supporting said body on said frame, said frame and said body also having vertically disposed parts in interengagement with each other, said vertically disposed parts of the frame forming a backing for said jacket and being concealed anteriorly of the restoration by said vertically disposed parts, respectively, of the jacket-crown.

13. A dental restoration, comprising a frame and a companion jacket-crown mounted thereon, said jacket-crown comprising a hollow tooth-shaped body and said frame having a core part interfitting with said body internally thereof, said frame and said body having horizontally disposed parts in interengagement externally of said body at the lingual side of the latter for supporting said body on said frame, said frame and said body also having vertically disposed parts in interengagement with each other, said vertically disposed parts of the frame forming a backing for said jacket and being concealed anteriorly of the restoration by said vertically disposed parts, respectively, of the jacket-crown said core having a recess and said tooth-shaped body having a projection on the inner side of the anterior wall thereof interfitting with said core in said recess thereof.

14. A dental jacket-crown for a restoration of the frame-supported type, said jacket-crown comprising a tooth-shaped hollow body having recesses in its mesial and distal sides, respectively, open at the gingival edge of the jacket-crown and having mesial and distal recessed portions open at the outer lingual side of the jacket-crown and closed at the labial or buccal side of the jacket, each of said last mentioned recessed portions extending vertically in a gingival to incisal or occlusal direction and extending also laterally in a mesial-distal direction.

15. A dental jacket-crown for a restoration of the frame-supported type, said jacket-crown comprising a tooth-shaped hollow body having recesses in its mesial and distal sides, respectively, open at the gingival edge of the jacket-crown and having mesial and distal recessed portions open at the outer lingual side of the jacket-crown and closed at the labial or buccal side of the jacket, each of said last mentioned recessed portions extending vertically in a gingival to incisal or occlusal direction and extending also laterally in a mesial-distal direction, said jacket having an outer wall at its lingual side having opposite mesial and distal side edges defining the inner lateral boundaries, of said last mentioned recessed portions respectively.

16. A restoration tooth adapted for securement to the core and adjacent parts of a restoration frame disposed laterally of said core, said tooth having an internal opening therein to receive said core, the lingual side of said tooth having a part extending vertically in a direction between the gingival edge and the opposite edge of the tooth and having edges adjacent the mesial and distal sides of the tooth, and vertical marginal edge portions on said tooth adjacent said mesial and distal sides, respectively of the tooth and said mesial and distal edges, respectively of said vertical part of the tooth, said vertical marginal edge portions terminating in horizontal shoulders, respectively, inwardly of said opposite edge, and being adapted to abut and interfit with said lateral parts, respectively, of the frame when said frame core is disposed in said internal opening of the tooth.

17. A restoration tooth adapted for securement to the core and adjacent parts of a restoration frame disposed laterally of said core, said tooth having an internal opening therein to receive said core, the lingual side of said tooth having a part extending vertically in a direction between the gingival edge and the opposite edge of the tooth and having edges adjacent the mesial and distal sides of the tooth, and vertical marginal edge portions on said tooth adjacent said mesial and distal sides, respectively of the tooth, and said mesial and distal edges, respectively of said vertical part of the tooth facing toward the lingual side of the tooth to abut and interfit with said lateral parts respectively, of the frame when said frame core is disposed in said internal opening of the tooth, said tooth having its gingival anterior edge mesially and distally contoured to provide interproximal spaces with an adjacent similar tooth in the gingival region.

18. A restoration tooth adapted for securement to the core and adjacent parts of a restoration frame disposed laterally of said core, said tooth having an internal opening therein to receive said core, the lingual side of said tooth having a part extending vertically in a direction between the opposite edges of the tooth and having vertical edges terminating laterally inwardly of the mesial and distal sides of the tooth, and vertical marginal edge portions on said tooth adjacent said mesial and distal sides, respectively, of the tooth, and said mesial and distal edges, respectively, of said vertical part of the tooth, facing toward the lingual side of the tooth to abut and interfit with said lateral parts respectively, of the frame when said frame core is disposed in said internal opening of the tooth.

References Cited in the file of this patent

UNITED STATES PATENTS 1,423,027   Rose                   July 18, 1922